United States Patent Office 3,524,767
Patented Aug. 18, 1970

3,524,767
METHOD OF OBTAINING COLLOIDAL SOLUTIONS OF STARCHES IN THE COLD STATE
Horst Kragen, Carentan, France, assignor to Societe de Produits Chimiques d'Auby, Neuilly-sur-Seine, Hauts-de-Seine, France
No Drawing. Filed June 23, 1967, Ser. No. 649,087
Int. Cl. C13l 1/08
U.S. Cl. 127—71     4 Claims

ABSTRACT OF THE DISCLOSURE

A method of rendering starches soluble in the cold state, in accordance with which the starch, normally insoluble when cold, is mixed while hot in a solution comprising at least one colloidal substance, the said method being mainly characterized in that the heating temperature is less than 100° C., and in that the said colloidal substance is advantageously anionic and of high molecular weight.

---

It is known that starches are in general only soluble in hot water, or better still, when a temperature close to boiling point is reached, which restricts their utilization in a large number of industrial applications. Although numerous tests have been carried out with the object of making the starches soluble in the cold state, it has however never been possible to go beyond the stage of pre-gelatinized starches which do not give real solutions in water but are only subjected to swelling. However, reference should be made to the soluble starch of Zulkowski, intended for laboratory use, obtained by heating starch and glycerol to between 150 and 190° C. After cooling and precipitation in alcohol, there is obtained a starch which is soluble in the cold state but degraded. The method is furthermore not applicable on an industrial scale, since the separation of the glycerol and the alcohol comes up against many difficulties, and in particular that of production cost.

In the industrial field, reference can also be made to attempts which have been undertaken to improve the methods of cold swelling of starches by subjecting them to instantaneous heating in the presence of colloidal agents which retard the swelling, practically without improving the dispersibility.

Amongst these agents, the use has been proposed of natural gums and also of alginates, but from the point of view of cold solubilization of starches, the results obtained are quite insufficient.

The present invention has for its object to provide a solution, in a simple and industrial manner, of this difficult problem of rendering starches soluble in the cold state, this result being obtained without substantially degrading the starches, even by improving and completing the natural physico chemical properties of the starches together with their organo-leptic properties when so required.

To this end, the invention has for its main object a method for rendering starches soluble in the cold state, according to which the starch, normally insoluble when cold, is mixed while hot in a solution comprising at least one colloidal substance, the said method being mainly characterized in that the heating temperature is less than 100° C., and in that the said colloidal substance is advantageously anionic and of high molecular weight.

This substance is preferably selected from the family of polysaccharide esters, preferably sulphatic, and more particularly from the group of salified acid esters of polysaccharides, especially of natural carriagheenanes (associated or not with other colloids), the said colloidal substance corresponding chemically to the general formula:

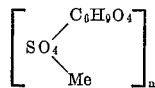

in which $n$ is a polymerization index and $M_e$ is, as is well known, a cation formed by one or more alkali, alkaline-earth or magnetic metals.

As natural colloidal substances possessing ester-sulphate groups, there may be cited various red and brown seaweeds, together with their extracts, such as carragheenanes, furcelleranes, agar-agar, fucoidine, etc.

Use may also be made of synthetic anionic colloids such as sulphatic dextranes, sulphatic laminarine, etc.

Experience has shown that the said normally soluble colloidal substances entrain the solubility of the starch treated, practically independently of the proportion between the starch and the colloidal substance, even for low percentages of the said substance.

In addition, the anionic nature of these products is transmitted to the starches treated, of which the structures and the physico-chemical behaviour are thereby modified, which may be very important in numerous industrial applications such as for example: treatment of textiles, paper-making paints, treatment of cements and plasters, flotation, food applications, etc.

It is in fact a case of new substances. The carragheenanes, mixed when so desired with other colloids, enter into the composition of new micellae, which then have the distinctive characteristics due to their anionic nature.

Some of these starch-colloid complex products, especially those intended for foodstuffs and which are above reproach with respect to the methods of treatment which are natural, have furthermore advantageous characteristics due to the starches and the treatment colloids, additional original characteristics of very great value, in particular: absence of smell which is sometimes typical of starches, improvement in the appearance of the texture, consistency, etc.

The interaction in the hot state between the starches and the treatment substances is very frequently facilitated by accessory operations such as:

The coagulation of the aqueous mixture of starch and colloidal substance or substances in a polar organic solvent, such as ethanol, isopropanol, acetone, etc.;

The atomization by spraying of a solution of starch and colloidal substance or substances;

The drying of a mixture of starch and colloidal substance or substances, preferably on heating drums;

The congealing after heating of a mixture of starch and colloidal substance or substances, preferably followed by recuperation of the complex formed after partial dehydration at ambient temperature and under vacuum, by drying with hot air or by the action of a polar organic solvent.

Other characteristic features of the invention will be further brought out in the description which follows below of a few non-limitative examples of application of the invention.

EXAMPLE 1

To 100 litres of a 1% aqueous solution of lambda carragheenane there is added while stirring, 1 to 5 kg. of cassava starch. In order to obtain a more rapid dispersion, it is possible to wet the starch previously with cold water. The mixture is then heated up to optimum solubilization of the starch, that is to say to about 95° C. for 15 minutes. The starch is then coagulated in isopropanol. The coagulum is separated from the alcohol by sieving, rewashed in pure alcohol in order to obtain more complete dehydration, centrifuged and then dried under vacuum. After grinding, the finished product is presented in the form of pale beige powder which is rapidly soluble by stirring in cold water.

EXAMPLE 2

To 100 litres of an aqueous solution of carragheenanes having a concentration of between 1% and 3%, there are added, under the same conditions as in Example 1, quantities of maize starch ranging from 1 to 9 kg. The mixture is heated up to solubilization and is then heated to 95° C. for one hour, after which it is coagulated in a polar organic solvent or is dried by spraying.

EXAMPLE 3

100 litres of an aqueous solution of potato starch flour having a concentration comprised between 1% and 4% are heated to 95° C. and mixed with 100 litres of a 1% aqueous solution of carragheenane, the temperature of which has previously been brought up to 60° C. After homogenization and without intermediate heating, the mixture can be immediately coagulated. It is also possible to employ the lyophilization technique.

EXAMPLE 4

There is prepared in the same manner as in Example 2, an aqueous mixture of carragheenane and maize starch. The solution is then passed through a heat exchanger in order to reduce its temperature to the vicinity of 5° C. to 10° C. and is thereafter distributed in a thin layer and cooled down rapidly to a temperature comprised between −5° C. and −30° C. After one hour, the congealed mass is then melted, either slowly on metallic gauze, or more rapidly in a drying machine. The starch and the carragheenane form a complex which then readily liberates the greater part of its water. This complex can then be dried in a current of hot air or dehydrated by a polar organic solvent.

EXAMPLE 5

100 litres of a 5% solution of guar and carragheenane are prepared in equal proportions. The mixture is heated to a temperature of 50° C. and a quantity of 10 to 25 kg. of starch is added to the solution. The mixture is then heated up to solubilization and the heating is maintained at 95° C. for 15 minutes.

The mixture is then coagulated in a polar organic solvent. The coagulum is centrifuged, dried under vacuum and then ground. There is obtained a light beige powder which is rapidly soluble in cold water by stirring.

It will of course be understood that the examples of application described above are capable of very numerous modifications, depending particularly on the origin and the nature of the starches treated, and also on the origin and the nature (which are extremely varied) of the treatment substances, preferably colloidal substances having a high molecular weight. Amongst these substances, natural carragheenanes, applied either alone or in combination with natural gums, especially guar gum, at present appear to be the most effective.

What is claimed is:

1. A method for the treatment of starch to render the same soluble in cold water without degradation in other properties which comprises heating an aqueous suspension of starch to a temperature below 100° C. in the presence of at least one colloidal anionic substance having a high molecular weight selected from the group of acid esters of polysaccharides represented by the formula

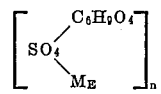

wherein $n$ denotes a high polymerization number and $M_E$ is a cation from the group Na, Ca, Mg and K, until the starch is solubilized, coagulating the resulting starch complex from the aqueous medium by admixture with a polar organic solvent, and recovering the coagulum.

2. A process according to claim 1 in which the starch suspension is heated in the presence of carrageenane and guar gum.

3. A process according to claim 1 in which the high-molecular weight colloidal substance is carrageenane, the temperature is about 95° C., and the polar solvent is isopropanol.

4. A process according to claim 3 in which the recovered coagulum is subsequently dried and pulverized.

References Cited

UNITED STATES PATENTS 2,830,916  4/1958  Brown _____ 117—156

OTHER REFERENCES

R. L. Whistler et al., "The Carbohydrates," W. Pigman, ed., Chapt. XII, 686–688, Academic Press, New York, 1957.

JOSEPH SCOVRONEK, Primary Examiner

S. MARANTZ, Assistant Examiner

U.S. Cl. X.R.

127—70